June 25, 1968 J. G. DE FLON 3,389,895
COOLING TOWER FILL BAR
Filed Jan. 24, 1967
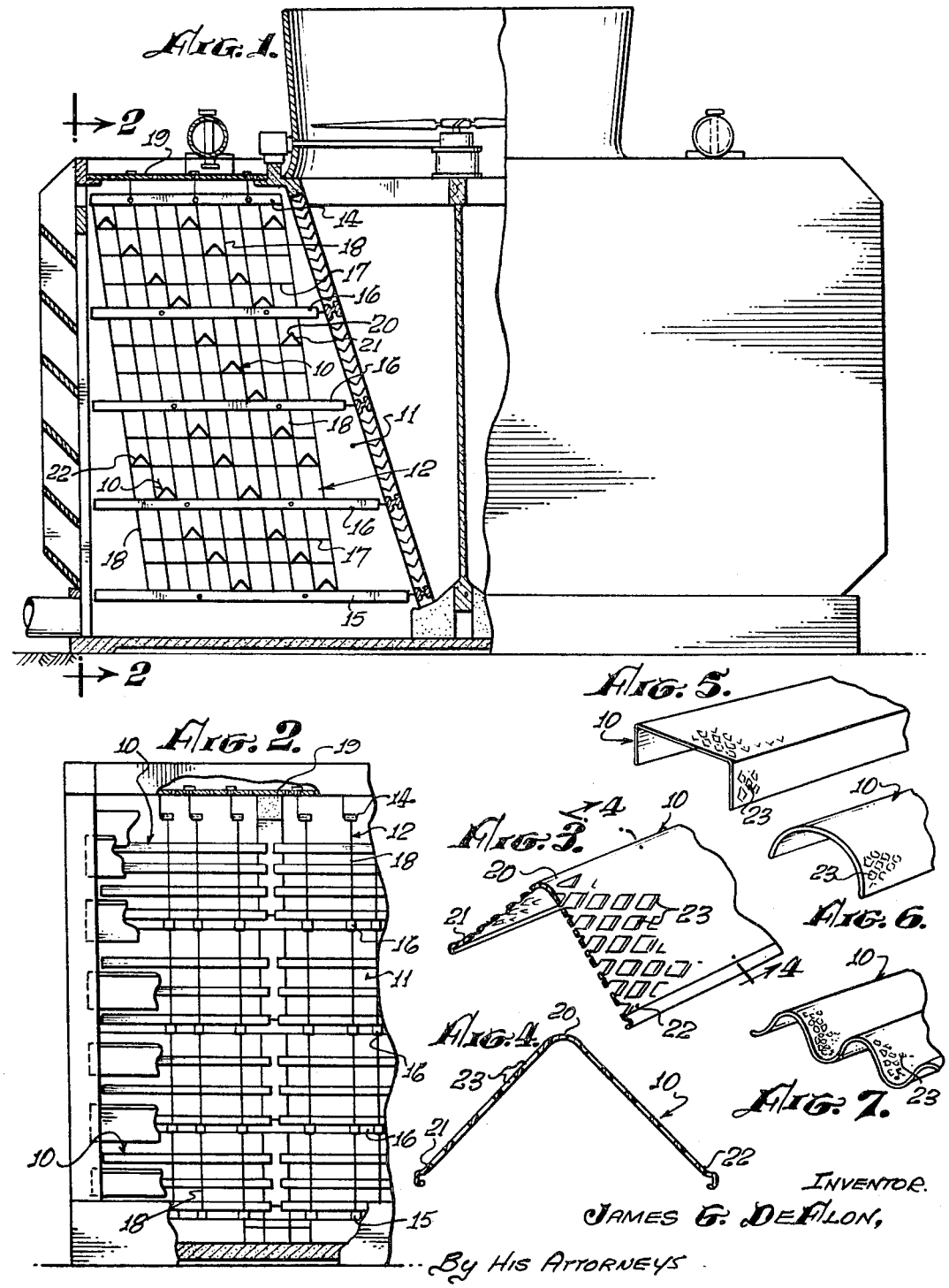
INVENTOR.
JAMES G. DE FLON,
By His Attorneys
Spensley & Horn.

United States Patent Office 3,389,895
Patented June 25, 1968

3,389,895
COOLING TOWER FILL BAR
James G. De Flon, Whittier, Calif., assignor, by mesne assignments, to De Flon-Anderson Co., Inc., Kansas City, Mo., a corporation of Delaware
Filed Jan. 24, 1967, Ser. No. 611,397
9 Claims. (Cl. 261—111)

ABSTRACT OF THE DISCLOSURE

A cooling tower including an improved splash fill bar and splash type fill assembly which are utilized to cool fluids of various kinds such as water, and by the reverse operation thereof for cooling air with water. A splash fill bar in accordance with the present invention is formed of plastic or metal of a comparatively thin wall having a geometric structural shape and of such size that it will span between supports without sagging or requiring tension to prevent sagging and being perforated with a multitude of holes being round, square, rectangular, oblong, or polygonal, these holes being of such size that both air and water will freely pass through.

BACKGROUND OF THE INVENTION

1. Field of the invention

Cooling towers of the type which are characterized by streams of water falling on fill bars arranged in a geometrical pattern within a cavity beneath the water distributing system and upon which the water falling by means of gravity splashes upon contact to form smaller droplets in a moving air stream are well known to the art.

In general, such cooling towers include a large housing through the side of which air is admitted and from the top of which the air is exhausted by suitable means such as exhaust fans. The water to be cooled is distributed throughout the housing from the upper surface of the housing by means such as the distributing pan. The water falls by gravity to a basin at the lower portion of the housing and is cooled during its descent by its intimate contact with air moving through the housing. During the descent of the water it is broken into the smallest globules possible by splashing upon fill bars which are interspersed throughout the cavity defined by the interior of the housing. The splash fill bars thus break up the downward flow of water and provide surface area of the water for commingling the water and air passing through the housing to promote cooling. As is well known, such cooling towers may be of the cross-flow type in which the air flows transversely to the descent of the water or of the counter-flow type in which the air travels in the direction opposite to the descent of the water. The improved splash bar and splash fill assembly of a cooling tower in accordance with the present invention are applicable to both counter-flow and cross-flow towers and are, in general, applicable to all types of towers in which the water to be cooled, or which provides the cooling medium, in the tower descends by gravity through the cooling area of the tower.

More particularly, cooling towers employing splash type fill may be characterized by the fact that streams of water fall upon fill bars arranged in a geometrical pattern wherein the water splashes upon contact and forms smaller droplets in a moving air stream. As the drops fall downwardly, some of the drops coalesce and once again impinge on the lower splash bars and the cycle is repeated.

As the relatively warm drops of water form, evaporation occurs on the surface of the drops and cooling progresses at a rapid rate. This is due to the temperature differential between the relatively warm water and the air having a relatively low wet bulb temperature. Cooling continues on the surface of an individual drop until the surface temperature approaches that of the wet bulb temperature of the surrounding air. When this occurs, the cooling process is retarded as cooling now is largely governed by conduction or convection from the inside to the outside of the drop which, and is, at a much lower rate. At this point it is advantageous to interrupt the fall of an individual drop by coalescing, splashing on the fill bar, or subdividing into new drops that expose fresh water surface more or less in equilibrium with the average water temperature to the moving air stream. By doing this, the rapid cooling cycle repeats itself.

Evaporation occurs both on the surface of the drops and on the surface of the fill bars. The cooling potential or driving force producing cooling can be described as the differential between the enthalpy of the air at its wet bulb temperature and the enthalpy of the air if its wet bulb temperature were raised to that of the water surface temperature. Cooling largely occurs because of evaporation on the water surface. Cooling can also occur to a lesser degree by the sensible heat difference between the water and the air. The wet bulb temperature is important because it alone largely describes the enthalpy of the air. For a given wet bulb temperature, the enthalpy of the air is almost completely independent of the dry bulb temperature of the air in the ranges commonly encountered in cooling towers.

The greater the vertical fall of the water from one fill bar until its fall is interrupted by another, the greater the kinetic energy of the drop, all other things being equal. The greater the kinetic energy of the falling drop, the smaller is the size of the new drops formed when the old drop impinges on the fill bar. Obviously for a given volume of water, the smaller the average diameter of the drops, the greater the surface area and the greater the degree of cooling.

2. Description of the prior art

Fill splash bars in accordance with the prior art are commonly made of solid rigid material such as wood and sometimes from solid plastic. The most common type of fill bars in the prior art are wood lathe, triangular wooden bars, polygonal wooden bars.

SUMMARY OF THE INVENTION

In general, the present invention comprises a fill bar formed of a relatively thin sheet of plastic or metal as defined hereinafter, with a multiplicity of openings defined thereby, which sheet is non-planar in cross-sectional configuration. In its presently preferred embodiment plastic is utilized and the cross-sectional configuration of the fill bar is generally triangular.

It is a primary object of the present invention to provide a fill assembly within a cooling tower through which fill assembly fluid descend, which fill assembly, increases the interruptions in the falling water for a given fill height, while at the same time maintaining the kinetic energy of the falling water at an increased rate to obtain the greatest water surface cooling area.

It is another object of the present invention to provide an improved splash fill bar, hereinafter termed "fill bar," which is simple and economical to construct but which has a long life in cooling towers of the type described.

It is another object of the present invention to provide a fill assembly for splash type cooling towers which has an improved efficiency in the dispersion of the falling water over those types of fill assemblies heretofore known to the art.

It is a further object of the present invention to provide a fill bar for use in fill assemblies of splash type cooling towers which is retained in its predetermined position and which is efficient in operation.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWING

In the drawing:

FIGURE 1 is a partially schematic view of a typical cross-flow cooling tower illustrating the dispersion of a presently preferred embodiment of a fill bar in accordance with the present invention throughout the housing of the cooling tower;

FIGURE 2 is a sectional partial view taken along line 2—2 of FIGURE 1;

FIGURE 3 is a perspective view of the presently preferred embodiment of a fill bar in accordance with the present invention;

FIGURE 4 is a sectional view taken along line 4—4 of FIGURE 3;

FIGURE 5 is an alternative embodiment of the present invention;

FIGURE 6 is a second alternative embodiment of the present invention; and,

FIGURE 7 is a third alternative embodiment of the present invention.

DESCRIPTION OF THE PREFERRED EMBODIMENTS

Referring now to the drawing and particularly to FIGURES 1, 2 and 3, a plurality of the fill bars in accordance with the present invention, designated generally as 10, are dispersed throughout the fill cavity of the cooling tower housing, the cavity being designated generally as 11. Although not limited thereto, the fill bars in accordance with the present invention, have been found to be particularly suited to positioning within the fill area of the cooling tower by means of a vertically hung grid, designated as 12 in FIGURE 1. The grid is typically a polyvinyl chloride coated metal grid, such as, common hog wire. The grid is hung between the upper and lower surfaces of the fill area by an upper fastening means 14 and a lower fastening means 15 in FIGURE 1. A plurality of rigid members 16 may be spaced vertically along the grid to maintain its rigidity and alignment. Thus, as shown in FIGURES 1 and 2, each of the fill bars 10 is hung between at least two vertically depending grid structures so that the fill bars are oriented in a predetermined pattern within the fill area of the cooling tower. Each of the bars is then supported by a horizontal wire 17 in the metal polyvinyl chloride grid and is positioned between two of the vertically extending wires 18 of the grid. It can be seen that the horizontal distance by which the vertically extending grids are spaced is dependent upon the length of the fill bar. The number of such suspended grids is, in turn, dependent upon the width of the cooling tower. It is apparent that the supporting grids and the fill bars are hung and positioned in such manner as to completely fill the entire fill area through which the water descends when discharged from the water distributing pan 19.

In its presently preferred embodiment, the fill bar is formed of polyvinyl chloride plastic in sheet form, the sheet being approximately .010 to .080 inch in thickness. The sheet is then permanently creased or bent to form a generally equilateral triangle, the legs of which are formed by the fill bar sheet and the base of which is open. Thus, the fill bar although triangular in configuration forms only the legs of the triangle with an open base. In positioning the fill bar within the fill assembly of the cooling tower the apex 20 of the fill bar as shown in FIGURES 3 and 4, is uppermost while the base of the legs 21 and 22 rest upon the horizontal wire of the grid and preferably rest against the vertical wires of the grid as shown in FIGURE 4, and described more fully hereinafter.

The fill bar defines a plurality of perforations through the walls thereof such that it approaches an open mesh type construction. Each of the openings is polygonal in configuration in the presently preferred embodiment and is designated as 23 in FIGURES 3 and 4. Such openings are formed by stamping or other convenient method known to the art.

It is important that the openings be large enough to prevent the water from filming over the surface and closing them and also large enough to allow air to pass through the openings; while at the same time they must be small enough to disperse the greatest number of falling drops or water streams into smaller drops. It has been found that the fill bar as described above, acts as a sprinkler. Streams of water falling on the perforated fill bar becomes its own sprinkler. The relatively small drops are formed without the substantially complete loss of kinetic energy as occurs when a drop falls on the solid flat fill bar.

It has been found that by perforating the fill bars as described above, the performance is increased over that of the same solid shape without the perforations. These holes can be any shape, such as round, square, rectangular, oblong, or polygonal.

It has been observed on a sloping surface that as the openings are reduced in size, approaching that of approximately ⅛-inch across, the water tends to film over the opening and tends to obstruct the passage of air. It is important in this invention that these openings be of such size that there is a splashing action rather than a filming action, and, in addition, the openings must be large enough to allow the moving air stream to pass through. In the present invention the open area of the perforated portion of the fill bars should be between 10 percent and 80 percent for maximum effectiveness.

Although in its presently preferred embodiment the fill bar of the present invention has a cross-sectional configuration of two sides of an equilateral triangle other forms may also be used. Thus, the fill bar may take the cross-sectional configuration of a channel as shown in FIGURE 5, a crescent as shown in FIGURE 6, or a corrugated type sheet material as shown in FIGURE 7. The corrugated type of fill bar is preferably positioned in a substantially horizontal manner within the structure shown in FIGURE 1. It should be noted that the primary purpose of the non-planar configuration of the fill bar is that it thereby achieves a structural rigidity, i.e., it is important that the shape and size of the fill bar be such that structurally it will span the distance between supports, such as 12 in FIGURE 1, without noticeable sagging after long periods of use and the impingement of large quantities of water.

Although the presently preferred embodiment of the fill assembly, in accordance with the present invention, has been described in connection with a support formed of a polyvinyl chloride coated grid, such as hog wire fencing, the bars can be supported on horizontal timber members as a means well known to the art. Such timber members are attached to the cooling tower frame. Fill bars in accordance with the present invention, can also be placed sufficiently close together horizontally that they form a substantially solid or continuous layer of perforated material. The embodiment shown in FIGURE 5, in effect constitutes a substantially horizontal perforated plate with upstanding ribs to give structural rigidity between supports.

In the past it has been found desirable to make the non-perforated plastic fill bars in a structural shape approximately 1 to 2 inches wide, and the thickness of the material fairly thin to utilize as little plastic as possible to reduce the cost. When this is done, wind and air current may tend to cause the light fill bars to flutter, rise, turn over or become displaced. In utilizing the wire or plastic fill support racks, per FIGURES 1, 2 and 3 the fill bars can be angular in shape such as the legs of an angle. The distance between the legs of the angle of the fill bar can be made wider than the openings; thus, the legs of the angle fill bars are wedged in place in such a way that the tension between the legs of the angle will cause the extremities of the angle to press against the substantially vertical wire, thus holding them in place by spring action. Another method of preventing this movement is accomplished by making the width of the fill bar narrower than that of the vertical wires and placing a cross wire immediately above the fill bar to restrain its movement. In this way the fill bars cannot turn over or become displaced.

What is claimed is:

1. In a cooling tower of the splash type wherein a plurality of splash fill bars are laterally supported within the fill area of said tower by at least two spaced apart, vertically oriented, grid-like, support assemblies, each support having substantially horizontal and generally upwardly extending members, each of said splash fill bars being supported on one of said horizontal members between two adjacent upwardly extending members of at least two of said support grid assemblies, an improved splash fill bar comprising:
   a unitarily formed elongate member having an open base and upwardly closing walls of sheet material, said walls defining a plurality of openings therethrough of sufficient size to admit of liquid dispersal and passage therethrough.

2. A splash fill bar as defined in claim 1 wherein the base dimension of said splash fill bar is approximately equal to but greater than the distance between said adjacent upwardly extending members of said grid support assemblies and each of said openings through said walls has a maximum dimension of at least 0.125 inch.

3. A splash fill bar as defined in claim 1 wherein said upwardly closing walls of said splash fill bar are two sides of a triangle, the base of said triangular fill bar being open, and said upwardly closing walls are made of plastic from 0.010 to 0.080 inch in thickness.

4. A splash fill bar as defined in claim 3 wherein the distance between the open base and closed apex of each of said triangular fill bars is approximately equal to the distance between adjacent ones of said horizontally extending members in said grid support assembly.

5. In a cooling tower of the splash type having a splash fill assembly positioned within the fill area of said tower, the improvement thereon comprising in combination:
   a plurality of splash fill bars, each of said splash fill bars being a unitarily formed elongate member having an open base and upwardly closing walls of sheet material, said walls forming a web-like structure which defines a plurality of openings arranged to admit of liquid dispersal and passage therethrough;
   a plurality of spaced apart vertically suspended support grid assemblies positioned within the fill area of said tower, each of said support grid assemblies being constructed of substantially horizontally and generally upwardly extending members; and,
   each of said splash fill bars being supported on one of said horizontal members between two adjacent upwardly extending members of at least two of said support grid assemblies.

6. In the combination defined in claim 5 wherein the base dimension of each of said splash fill bars is approximately equal to but greater than the distance between two adjacent ones of said upwardly extending members of said support grid assembly and each of said openings through said walls of each of said splash fill bars has a maximum dimension of at least 0.125 inch.

7. In the combination defined in claim 5 wherein the upwardly closing walls of each of said splash fill bars are two sides of a triangle, the base of said triangle being open, said upwardly closing walls being made of plastic having a thickness of from 0.010 to 0.080 inch.

8. In the combination defined in claim 7 wherein the distance between the open base and closed apex of said triangular fill bar is approximately equal to the distance between adjacent ones of said horizontally extending members in each of said support grid assemblies.

9. In a cooling tower of the splash type having a splash fill assembly positioned within the fill area of said tower, the improvement thereon comprising in combination:
   a plurality of splash fill bars, each of said bars being a unitarily formed elongate member having upwardly closing walls of a thin plastic sheet material that define a cross sectional triangle having an open base, said walls forming a web-like structure which defines a plurality of openings therethrough, the maximum dimension of each of said openings being at least 0.125 inch to admit of liquid dispersal and passage therethrough;
   a plurality of spaced apart vertically suspended support grid assemblies positioned transversely with respect to said fill bars within said fill area and anchored adjacent the bottom of said tower, said support grid assemblies being constructed of a plurality of substantially horizontally and generally upwardly extending members which intersect one another to form a plurality of parallelogram grids; and,
   each of said splash fill bars being supported by the horizontal portion of one of said parallelogram grids of at least two of said support grids, the base dimension of each of said splash fill bars being approximately equal to but greater than the distance between two adjacent ones of said upwardly extending members of said grids.

References Cited

UNITED STATES PATENTS

| 736,087 | 8/1903 | Graham. | |
| 899,899 | 9/1908 | Petersen | 261—94 |
| 984,660 | 2/1911 | Haas. | |
| 1,659,408 | 2/1928 | Nicholls. | |
| 2,634,959 | 4/1953 | Cave. | |
| 2,998,234 | 8/1961 | Haselden | 261—113 |
| 3,031,173 | 4/1962 | Kohl et al. | |
| 3,044,237 | 7/1962 | Mart. | |
| 3,195,870 | 7/1965 | Gruber et al. | |
| 3,226,098 | 12/1965 | Shryock. | |

FOREIGN PATENTS

| 637,238 | 2/1962 | Canada. |

OTHER REFERENCES

"Spraypak"; S. Blickman, Inc.; Weehawken, N.J., © 1955.

HARRY B. THORNTON, *Primary Examiner.*

TIM R. MILES, *Examiner.*